US010084855B2

(12) United States Patent
Choi

(10) Patent No.: US 10,084,855 B2
(45) Date of Patent: Sep. 25, 2018

(54) PIXEL-BASED LOAD BALANCING

(71) Applicant: Akamai Technologies, Inc., Cambridge, MA (US)

(72) Inventor: Byung K. Choi, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 139 days.

(21) Appl. No.: 15/412,288

(22) Filed: Jan. 23, 2017

(65) Prior Publication Data

US 2018/0213030 A1 Jul. 26, 2018

(51) Int. Cl.

| | |
|---|---|
| ***H04L 29/08*** | (2006.01) |
| ***G06T 3/40*** | (2006.01) |
| ***G06T 9/00*** | (2006.01) |
| ***G06K 9/62*** | (2006.01) |
| *H04N 19/426* | (2014.01) |

(52) U.S. Cl.

CPC ........ *H04L 67/1008* (2013.01); *G06K 9/6298* (2013.01); *G06T 3/4092* (2013.01); *G06T 9/00* (2013.01); *G06T 2210/22* (2013.01); *H04N 19/428* (2014.11)

(58) Field of Classification Search

CPC ............ H04L 67/1008; H04L 67/1004; H04L 67/1014; H04L 51/10; H04L 63/08; H04L 67/04; H04L 67/06; H04L 67/101; H04L 67/1023; H04L 67/28; H04L 67/2804; H04L 67/2809; H04L 67/2814; H04L 67/2819; H04L 67/2823; H04L 67/2828; H04L 67/2838; H04L 69/22; H04L 69/24; H04L 69/26; G06K 9/6298; G06T 3/4092; G06T 9/00; G06T 2210/22; H04N 19/428

See application file for complete search history.

(56) References Cited

U.S. PATENT DOCUMENTS

| | | | |
|---|---|---|---|
| 6,108,460 | A | 8/2000 | Rich |
| 6,820,133 | B1 | 11/2004 | Grove et al. |
| 7,111,057 | B1 | 9/2006 | Wein et al. |

(Continued)

OTHER PUBLICATIONS

RFC: 793, Transmission Control Protocol, Darpa Internet Program, Protocol Specification, Sep. 1981, 90 pages.

(Continued)

*Primary Examiner* — Greg C Bengzon

(57) ABSTRACT

Disclosed are methods, systems, and apparatus for load-balancing image-processing jobs based on the number of pixels in the images and/or the nature of the processing that is requested on those pixels. For example, a set of machines may run software to provide various types of image processing services, such as format conversion, recompression, resizing, cropping, among others. These are referred to as image servers. In accordance with the teachings hereof, the load on each image server can be calculated based on the number of pixels in the images that are waiting to be processed in the image server's processing queue, adjusted by the type of processing that is requested on each image. The adjustment typically reflects and adjusts for the relative time needed to perform various types of processing. Load scores can be further adjusted based on the processing capabilities of each image server, in some embodiments.

14 Claims, 10 Drawing Sheets

(56) References Cited

U.S. PATENT DOCUMENTS

| | | | |
|---|---|---|---|
| 7,120,687 B1* | 10/2006 | Tessman, Jr. | G06F 21/6209 709/224 |
| 7,240,100 B1 | 7/2007 | Wein et al. | |
| 7,274,658 B2 | 9/2007 | Bornstein et al. | |
| 7,296,082 B2 | 11/2007 | Leighton et al. | |
| 7,376,716 B2 | 5/2008 | Dilley et al. | |
| 7,472,178 B2 | 12/2008 | Rose et al. | |
| 7,653,706 B2 | 1/2010 | Day et al. | |
| 7,660,296 B2 | 2/2010 | Fletcher et al. | |
| 8,060,581 B2 | 11/2011 | Day et al. | |
| 8,346,956 B2 | 1/2013 | Day et al. | |
| 8,615,577 B2 | 12/2013 | Black et al. | |
| 8,683,079 B2 | 3/2014 | Day et al. | |
| 8,805,965 B2 | 8/2014 | Day et al. | |
| 9,197,642 B1* | 11/2015 | Urbach | H04L 67/38 |
| 9,418,353 B2 | 8/2016 | Kobrin et al. | |
| 9,419,852 B1 | 8/2016 | Kobrin et al. | |
| 9,704,270 B1* | 7/2017 | Main | G06T 9/00 |
| 10,027,927 B2* | 7/2018 | Abkairov | H04L 65/60 |
| 2001/0029523 A1* | 10/2001 | Mcternan | G06F 17/30905 709/205 |
| 2003/0158913 A1* | 8/2003 | Agnoli | H04L 29/06 709/219 |
| 2004/0165610 A1* | 8/2004 | Chasin | H04L 67/06 370/428 |
| 2005/0097445 A1* | 5/2005 | Day | H04L 12/14 715/255 |
| 2005/0213832 A1* | 9/2005 | Schofield | H04L 67/1097 382/240 |
| 2006/0221087 A1 | 10/2006 | Diard et al. | |
| 2007/0201502 A1* | 8/2007 | Abramson | H04L 67/32 370/429 |
| 2007/0204003 A1* | 8/2007 | Abramson | H04L 67/06 709/217 |
| 2008/0098101 A1* | 4/2008 | Black | H04L 67/1008 709/223 |
| 2008/0304770 A1* | 12/2008 | Latour | G06T 3/4092 382/307 |
| 2009/0288096 A1 | 11/2009 | El-Mahdy et al. | |
| 2010/0125649 A1* | 5/2010 | Day | H04L 29/12066 709/219 |
| 2011/0173345 A1 | 7/2011 | Knox et al. | |
| 2011/0269437 A1* | 11/2011 | Marusi | G06F 17/30905 455/414.1 |
| 2012/0150993 A1 | 6/2012 | Flack et al. | |
| 2012/0203861 A1* | 8/2012 | Flack | G06Q 10/10 709/217 |
| 2013/0166634 A1 | 6/2013 | Holland et al. | |
| 2013/0198759 A1 | 8/2013 | Shah et al. | |
| 2013/0219024 A1* | 8/2013 | Flack | H04L 67/2804 709/219 |
| 2014/0098220 A1 | 4/2014 | Negro et al. | |
| 2014/0132610 A1* | 5/2014 | Lerios | G06T 1/00 345/501 |
| 2014/0267356 A1* | 9/2014 | Minkin | G06T 5/002 345/589 |
| 2014/0280515 A1* | 9/2014 | Wei | H04L 67/02 709/203 |
| 2014/0280746 A1* | 9/2014 | Johns | H04L 67/06 709/219 |
| 2014/0280969 A1* | 9/2014 | Wood | H04L 67/02 709/226 |
| 2014/0333640 A1* | 11/2014 | Dodge | G06T 9/00 345/522 |
| 2014/0333641 A1* | 11/2014 | Dodge | G06T 9/00 345/522 |
| 2015/0074232 A1* | 3/2015 | Phillips | H04L 65/604 709/219 |
| 2015/0205500 A1* | 7/2015 | Zacharias | H04L 67/42 715/763 |
| 2015/0281114 A1 | 10/2015 | Wong et al. | |
| 2015/0332127 A1* | 11/2015 | Zheng | G06T 7/11 382/165 |
| 2016/0021041 A1* | 1/2016 | Zacharias | H04L 51/10 709/203 |
| 2016/0164961 A1* | 6/2016 | Malaviya | H04L 67/104 709/201 |
| 2017/0011487 A1* | 1/2017 | Billyard | G06T 15/005 |
| 2017/0025098 A1* | 1/2017 | Keramidas | G09G 5/026 |
| 2017/0055012 A1* | 2/2017 | Phillips | H04L 67/06 |
| 2017/0078376 A1* | 3/2017 | Coward | H04L 67/1008 |
| 2017/0099341 A1* | 4/2017 | Joe | H04L 67/06 |
| 2017/0178597 A1* | 6/2017 | Hasselgren | G06T 7/0051 |
| 2017/0180272 A1* | 6/2017 | Bernath | H04L 49/3054 |

OTHER PUBLICATIONS

The Linux Virtual Server Project—Linux Server Cluster for Load Balancing, downloaded on Jan. 9, 2017, 2 pages. Source: http://www.linuxvirtualserver.org/index.html.

Akamai, Akamai EdgeScape, 2002, downloaded Jan. 9, 2017 from Web Archive from 2013, 4 pages. Source: https://web.archive.org/web/20131008115114/http://www.akamai.com/dl/brochures/edgescape.pdf.

Akamai, Akamai Web Performance Solutions: Product Brief, Image Manager, Intelligent Image Management Made Simple, Aug. 2016, 2 pages.

Belshe, M. et al., IETF, RFC 7540, Hypertext Transfer Protocol Version 2 (HTTP/2), May 2015, 96 pages.

R. Braden, Ed., IETF, Request for Comments: 1122, Requirements for Internet Hosts—Communication Layers, Oct. 1989, 116 pages.

Downton, A. et al., Parallel architectures for image processing, Electronics & Communication Engineering Journal, Jun. 1998, downloaded Dec. 9, 2016 from http://docslide.us/download/link/parallel-architectures-for-image-processing.

Hamdi, Mounir et al., Dynamic Load Balancing of Data Parallel Applications on a Distributed Network, Department of Computer Sciences, Hong Kong University, 1995, 10 pages. Downloaded Dec. 9, 2016 from https://www.researchgate.net/profile/Mounir_Hamdi/publication/221235951_Dynamic_Load_Balancing_of_Data_Parallel_Applications_on_a_Distributed_Network/links/56a2482f08ae1b65112c8735.pdf.

Haproxy, "The Reliable, High Performance TCP/HTTP Load Balancer" downloaded on Jan. 9, 2017, Dec. 25, 2016, 15 pages. Source: http::www.haproxy.org/.

Moloney, B. et al., "Scalable Sort-First Parallel Direct Volume Rendering with Dynamic Load Balancing, Eurographics Symposium on Parallel Graphics and Visualization," 2007, 9 pages, downloaded Dec. 9, 2016 from http://vis-web.informatik.uni-stuttgart.de/~weiskopf/publications/egpgv07.pdf.

W3C, Navigation Timing, W3C Recommendation, Dec. 17, 2012, 14 pages. Source: downloaded Jan. 19, 2017 from https://www.w3.org/TR/2012/REC-navigation-timing-20121217/.

W3C, Resource Timing Level 1, W3C Candidate Recommendation Jul. 21, 2016, downloaded on Jan. 9, 2017, 21 pages. Downloaded from https://www.w3.org/TR/2016/CRresourcetiming120160721/.

Wilhelm, R., "The Worst-Case Execution Time Problem—Overview of Methods and Survery of Tools", available at https://pdfs.semanticscholar.org/be10/77b63ba33ad608d7208b6e31c9065d7b1bac.pdf?_ga=1.252162177.909032227.1485812314, 52 pages, published as ACM Transactions on Embedded Computing Systems, 2008, according to Semantic Scholar.

Wilhelm, R., Semantic Scholar web page, "The worst case execution time problem—overview of methods and survey of tools," 7 pages, downloaded Jan. 30, 2017 from www.semanticscholar.org.

Wilhelm, R., "The Worst-Case Execution Time Problem—Overview of Methods and Survey of Tools", available at http://moss.csc.ncsu.edu/~mueller/ftp/pub/mueller/papers/tecs07.pdf, 49 pages, downloaded Jan. 30, 2017.

* cited by examiner

Web Image

PIXEL-BASED LOAD BALANCING

BACKGROUND

Technical Field

This application relates generally to load balancing and more particularly to load balancing image processing tasks in a distributed computing system.

Brief Description of the Related Art

Web images are a significant portion of web page content that must be downloaded, often representing more than half of the entire web page size in bytes. One challenge of serving web images is the variety of end user client devices. It is desirable to optimize an image in light of the particular capabilities of the end user's client device. Client devices increasingly vary in display and processing capabilities; typical user equipment may range from desktop or laptop computers to hand held devices, such as tablets or smart phones.

The encoding of web images has been well standardized through use of well-known compression techniques and formats. Standard communication protocols, such as HTTP, have been established to enable client devices to retrieve web image objects over computer networks. The result is that a client device can reliably retrieve standardized web images over the Internet and open them on the user's end for viewing. This decoupling of server-side and client-side is a critical factor to a wide adoption of web images by most web sites.

While the decoupling of web image construction (on the server side) and end user rendering (on the client side) has been a key to the success of web images, it brings a challenge: the mismatch between production and rendering equipment. This mismatch is evident in at least two ways: the size of an original web image may or may not well fit the size of the end user's display panel in the framework of the web page. Second, the resolution of the original web image can be higher than that of the display of the end user's client device.

Clearly, one solution is to create many different versions of an original web image, and then select a version that best fits each category of end user client device that is asking for the image, in accordance with its capabilities and characteristics. As is known in the art, one way to recognize the capability of the end user device is to utilize the HTTP request message header "User Agent", where the requester usually puts the information about the entity that is sending the HTTP request. In many cases, the information includes the browser name and version, which can be used for the purpose of characterizing the end user client device. In this regard, see U.S. Pat. Nos. 9,419,852 and 9,418,353, the entire contents of which are incorporated by reference for all purposes. In an advanced method, one can rely on the intelligence of CDN (Content Distribution Network) provider's about the end user client device and network connection type. In this regard, see U.S. Pat. Nos. 8,805,965 and 8,346,956 and 8,060,581 and 7,653,706, the entire contents of which are incorporated by reference for all purposes.

A general web image service logic, known in the art, may proceed as follows: 1) The end user client device sends an HTTP request message (e.g., 'Get') to a server; 2) The server examines the user-agent header in the request message; 3) In one method, a CDN provider service is engaged to pin-point the capabilities and network type of the end user client device, and provides it to the server (alternatively the server itself might determine it); 4) The server selects a version of the image object that best fits the capability of the end user client device; 5) If a best fitting version is not found, the server can create one in the course of reply, dynamically; 6) The server sends an HTTP reply message back to the end user client device with the selected image or newly created version.

While this approach works, creating and maintaining a comprehensive set of versions for each and every web image, in light of the increasing number and variety of end user client devices, is a significant practical challenge for most content providers. Many web site owners do not have resources or infrastructure to handle this problem.

One known solution is to use a third party entity's image management services, which are specialized to handle web image creation, maintenance and delivery to all end users on a global scale, such as is currently provided by a CDN such as Akamai Technologies.

Typically, such a third party entity deploys servers on a global scale, and utilizes the servers for the full cycle of web image creation, maintenance, and delivery to end users regardless of the end user location. In this case, the web image service logic changes as follows, for example: 1) The website owner changes the URL for their web image to a domain and URL managed by the 3rd party entity. 2) The end user client device sends an HTTP request message for the web image to the third party server. 3) The third party server determines the capabilities of the end user client device with the user-agent information in the request message and the type of network, to which the end user is connected. 4) The third party server selects or creates a version of the image object, which best fits the overall capability of the end user device; 5) The 3rd party server sends an HTTP reply message back to the end user with the selected or just created version.

In an alternate approach, known in the art, the end user client device contacts a first third party server for the web image using the changed domain or URL, and the first third party server either redirects the client device to a second third party server to get the appropriate version of the image. Or, the first third party server itself contacts the second third party server to get the appropriate version of the image, in a proxy operation. In either case, the first third party server can embed image processing instructions and parameters in URL parameters (i.e., in a URL rewrite or redirect) or otherwise in a message sent to the second third party server.

As image traffic grows, the third party servers performing image processing tasks, such as those just described, are deployed in clusters with multiple servers in a cluster. Like any other computer cluster, the image optimization cluster can utilize load balancing such that a web image service request is directed to one machine, preferably though not necessarily one of the least loaded machines at the time.

FIG. 1 is a schematic diagram showing the general functional architecture of cluster load balancing. FIG. 1 is a generic architecture and includes, but is not limited to, image processing. As shown in FIG. 1, a cluster has an entity "load balancer". The load balancer interfaces with a client, receives a request and directs it to a server. Note that the 'client' could be the end user client device, but also could be another server in the third party (CDN) infrastructure. Each server in return has to feedback the load information to the load balancer. Practically, the load balancing functions are paired with some load feedback mechanisms. The load balancer can be implemented as a separate appliance or located in one of the servers. As the cluster grows, the load balancer itself can be implemented by a group of machines, too. Most importantly, the architecture shows that each server has to report its load status back to some functionally central entity, which, by processing the reports, is able to tell which server should take the next service request. The reporting period, the load metrics in the report and report processing algorithms are all different in different designs.

One straightforward load-balancing approach is to count the number of web image requests directed to a server, or equivalently the number of HTTP request messages directed to a server. A more granular approach, also straightforward, is to count the number of microprocessor (CPU) tasks created for image requests inside each machine.

There are publicly open libraries for cluster load balancing. Such packages are typically dependent upon generic metrics because the software needs to be application independent. Some examples are HAProxy and Linux Virtual Server.

While these application-independent approaches might seem reasonable in view of the service logic, which is converted to HTTP protocols on the networks and microprocessor scheduling inside of the server, they are often inaccurate. This is because the actual load induced by the same request count can vary widely. There may be a variety of reasons for this: for example, there can be some error messages in HTTP protocol-based communication, which introduces error into that method. Further, requests do not always produce the same amount of load as one another.

Hence, there is a need for improved technology to load balance image requests across multiple machines in a cluster, and/or across multiple clusters. The teachings herein address these needs and also provide other benefits and improvements that will become apparent in view of this disclosure.

SUMMARY

Disclosed herein are systems, methods and apparatus for load-balancing image-processing jobs across machines based on the number of pixels in the images and/or the nature of the processing that is requested and/or must be performed on those pixels. For example, assume a set of distributed machines runs software to provide various types of image processing services, such as format conversion, recompression (e.g., recompression of JPEG images to smaller file size/lower quality), resizing, cropping, downsizing, composing images, background coloring or watermarking, among others. Each such combination of software and hardware is referred to herein as an image server. Note that the teachings hereof may be used with any image processing service and are not limited to the services listed above.

In accordance with the teachings hereof, the load on each image server can be calculated based not on the number of image processing requests in its queue, but on the number of pixels in the images referenced or included in those requests. The number of pixels can be adjusted by a factor reflecting the kind of processing that is requested on each image, to create an effective pixel value that enables a true comparison across services. The adjustment typically reflects and adjusts for the relative the time needed to perform various types of processing. The adjustment can entail normalizing the pixel counts across services. Pixel load scores can be further adjusted based on the processing capabilities of each image server, as indicated for example by a pixel drain rate.

The term image server is meant to include one or more programs running on server hardware to provide image processing services. The term image server includes one or more programs running in a virtual machine on server hardware. No combination of hardware and software, which is an implementation choice, is excluded by the term image server. The term image server does not exclude servers that perform functions in addition to image processing, such as other content delivery functions.

The term load balancer, load balancing node, load balancing machine is meant to include one or more programs running on computer hardware that provide load balancing. The term load balancer includes one or more programs running in a virtual machine on the computer hardware. No combination of hardware and software, which is an implementation choice, is excluded by the term load balancer or load balancing node. The term load balancer does not exclude computers that perform functions in addition to load balancing, such as other content delivery functions.

In one aspect, there is a method of load-balancing image processing requests across a plurality of image servers in a distributed computing system. The method involves receiving a first request to process a first image, the first request comprising an identification of the first image (e.g., a URL referencing the image, or the image itself) and a directive to process the first image in accordance with a first image processing service (e.g., an instruction, code, or otherwise).

Image processing services may include such services as a service that converts an image from a first format to a second format; a service that changes a resolution of an image; a service that resizes an image; a service that crops an image; a service that changes a compression level applied to an image.

Continuing the method, the load balancer determines a number of pixels in the first image (e.g., by reading a number embedded in the request, or by obtaining and examining the image itself, or by receiving a message from an image server assigned the request with the number of pixels that the image server found in the image). The load balancer determines a load score for the first request, the load score based at least in part on the product of multiplying (i) the number of pixels in the first image, and (ii) a first factor associated with the first image processing service. The load balancer assigns the first request to a first image server of the plurality of image servers, e.g., because the first image server has the lowest load score at the time. (This assignment may occur before or after the load score for the current request is calculated.) The load balancer updates a current load score for the first image server by adding the load score for the first request to the current load score for the first image server. The load balancer receives receiving a second request to process a second image, the second request comprising an identification of the second image and a directive to process the second image in accordance with a second image processing service. The load balancer determines a number of pixels in the second image, determines a load score for the second request, the load score based at least in part on the product of multiplying (i) the number of pixels in the second image, and (ii) a second factor associated with the second image processing service. The load balancer assigns the second request to a second image server of the plurality of image servers. (Again This assignment may occur before or after the load score for the current request is calculated.) In light of said assignment, the load balancer updates a current load score for the second image server by adding the load score for the second request to the current load score for the second image server.

The method may also involve the load balancer receiving a message from the first image server that the first request is complete, and in response to the message, updating the current load score for the first image server by subtracting the load score for the first request from the current load score for the first image server.

The method may also involve the load balancer determining the load score for the first image server based at least in part on the product of multiplying (i) the number of pixels in the first image, and (ii) a first factor associated with the first image processing service and (iii) a third factor associated with processing capabilities of the first image server.

The method may also involve the load balancer calculating a first expected response time for the first image server based on the current load score for the first image server.

In some cases, the first factor reflects processing time necessary to provide the first image processing service for a given image relative to the processing time necessary to provide the second image processing service for the given image.

In another aspect, there is a distributed computing system for processing images, comprising a plurality of image servers, each comprising a computer having one or more microprocessors and memory storing program code executable on the one or more microprocessors to provide one or more image processing services. The system also includes a load-balancing node for distributing image processing requests amongst the plurality of image servers, the load balancing node comprising a computer having one or more microprocessors and memory storing program code executable on the one or more microprocessors. In this system, the load balancing node stores program code for receiving a first request to process a first image, the first request comprising an identification of the first image and a directive to process the first image in accordance with a first image processing service, and for determining a number of pixels in the first image. The load balancing node further stores code for determining a load score for the first request, the load score based at least in part on the product of multiplying (i) the number of pixels in the first image, and (ii) a first factor associated with the first image processing service. The load balancing node further stores code for storing program code for assigning the first request to a first image server of the plurality of image servers, and for in response to said assignment, updating a current load score for the first image server by adding the load score for the first request to the current load score for the first image server. The load balancing node further stores code for receiving a second request to process a second image, the second request comprising an identification of the second image and a directive to process the second image in accordance with a second image processing service, and for determining a number of pixels in the second image. The load balancing node further stores code for determining a load score for the second request, the load score based at least in part on the product of multiplying (i) the number of pixels in the second image, and (ii) a second factor associated with the second image processing service, and for assigning the second request to a second image server of the plurality of image servers, and for in response to said assignment, updating a current load score for the second image server by adding the load score for the second request to the current load score for the second image server. The section at the end of this document entitled Computer Based Implementation describes the hardware and software mechanisms that can be used to effect the above.

In another aspect, there is a method of load-balancing image processing requests across a plurality of image servers in a distributed computing system, the method operable at a load balancing node. The method involves updating (e.g., by a load balancer) an overall load score for each of the plurality of image servers, wherein the load balancing node determines the overall load score for a given image server at least in part based by summing image processing request scores for image processing requests that are in queue for the given image server. The load balancer determines each respective image processing request score at least in part by multiplying (i) the number of pixels in an image identified in the respective image processing request and (ii) a first factor associated with the image processing service specified in a directive in the respective image processing request. The load-balancer load-balances traffic amongst the plurality of image servers based on the updated load scores for each of the plurality of image servers. The load-balancing may be done, for example, by assigning new requests to the image servers with the then-current lowest overall load score, or so as to achieve the least expected response time, or to drive load to targets, or other configuration, for example.

In yet another aspect, there is a method of load-balancing image processing requests across a plurality of image servers in a distributed computing system. The method involves receiving a first request to process a first image, the first request comprising an identification of the first image and a directive to process the first image in accordance with a first image processing service. The method further involves determining a value representative of a number of pixels in the first image, and determining a load score for the first request, the load score based at least in part on (i) a value representative of a number of pixels in queue for each of the plurality of image servers, and (ii) a pixel drain rate for each of the plurality of image servers. The value representative of the number of pixels in the first image is any of: an actual pixel number and an effective pixel number. The method further involves assigning the first request to a first image server of the plurality of image servers (e.g., because the first image server has a lowest expected response time amongst the plurality of image servers, at the time of the first request). The method further involves, In response to the assignment updating the value representative of the number of pixels in queue for the first image server by adding thereto the value representative of the number of pixel in the first image. As those skilled in the art will recognize, the foregoing description merely refers to examples of the invention. It is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which.

DETAILED DESCRIPTION

Figure 1:
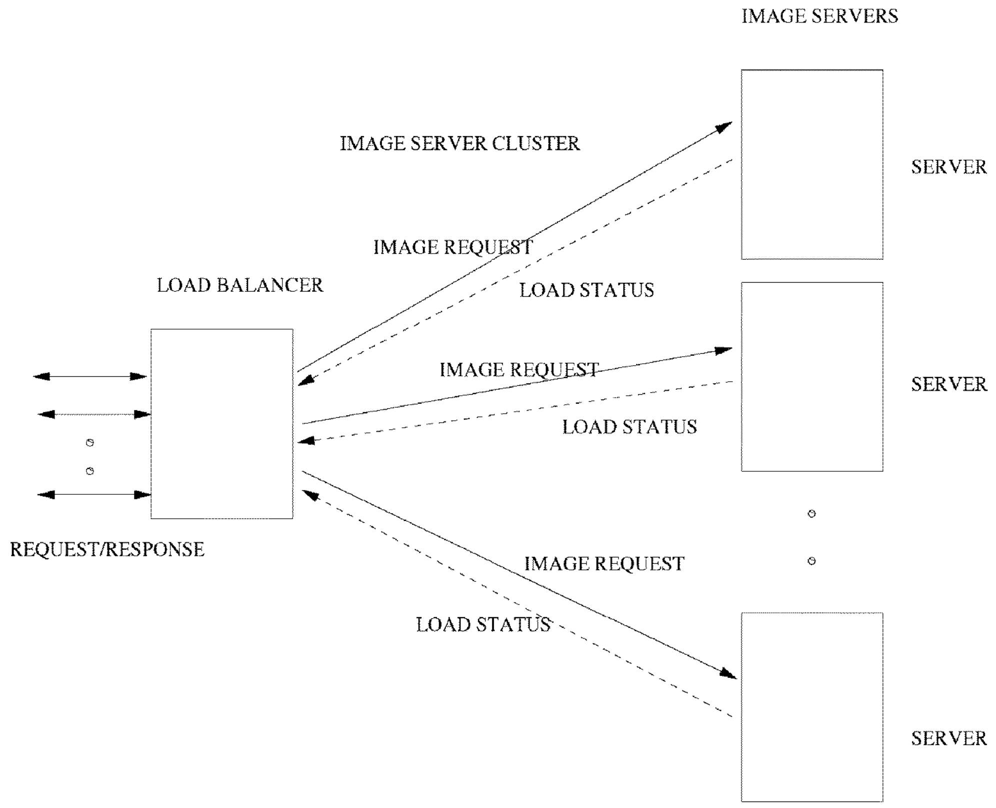
FIG. 1 is a schematic diagram illustrating one embodiment of a server cluster with multiple servers and a load balancer node.

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entireties, and for all purposes. The term “e.g.”, wherever appearing, is used as an abbreviation for the non-limiting phrase “for example.”

Introduction—General

One way to optimize image delivery is to use globally distributed image server clusters to process images for delivery in view of the end user client device’s capabilities and network type. Web image optimization can mean downsizing images, more aggressive compression, or some level of quality downgrading. The resultant faster downloading and tailored size will help the consumer better engage with the web site.

One challenge to building and operating such image server clusters is to measure each image server’s load and balance the load across the cluster to best utilize the cluster resources. Described herein are systems and methods for image server load balancing. According to the teachings hereof, image server load balancing techniques can operate on the principle that, for image processing, system resource consumption scales in proportion to the given number of pixels as the input. The systems, methods, and apparatus described herein preferably leverage the approximate linearity of system load versus the size of input pixels. For image services, this generally can involve counting the number of input pixels, determining the pixels arriving (service request) and leaving (service response), and maintaining a good balance of load across the image servers in a cluster, per configured targets, at least in one embodiment. Preferably, the approach can be based on the number of pixels in a processing job as an important and abstract indicator or metric of system load for image servers, regardless of the specifics of the hardware and software configuration of the image server.

Methods utilizing only generic metrics and not utilizing the number of pixels are likely to provide sub-optimal load balancing relative to the teachings hereof, which may subsequently result either in over-provisioning or under-provisioning, compared to an application specific, pixel-based approach.

Introduction—Web Image Files

Web image files are generally an array or a grid of pixels with metadata. The pixel is the smallest unit of image file construction and rendering. Low resolution images have a low number of bits to represent one pixel whereas high resolution images have a higher number of bits to represent each pixel.

Non pixel-based image file construction methods, like vector graphics, are usually converted to a pixel-based format to be properly displayed on an end user’s client device. In the industry, this kind of image format conversion is called rasterizing, as raster graphics is the general term to indicate the pixel-based format of image files.

The pixel-based approach not only drives the way the web image is constructed but also the way it is displayed on an electronic screen. Notably, each image element, a pixel, is rendered on an electronic display panel independently of others. One corrupted element generally will not block other elements from being properly displayed. As a display device type, LCD (Liquid Crystal Display) is fundamentally designed to show an image in a pixel by pixel method.

Figure 2:
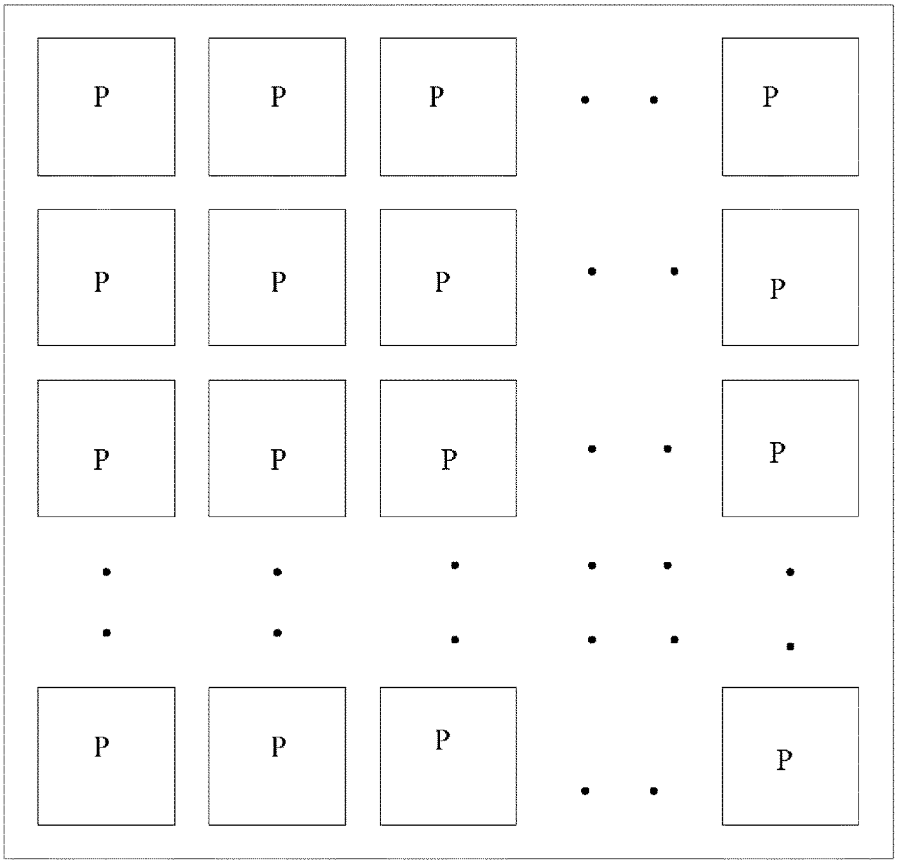
FIG. 2 is a diagram illustrating one embodiment of the pixel structure of an image.

FIG. 2 shows a conceptual diagram of web image structure. The label “P” represents a pixel; the web image is a collection of a large number of pixels. Each pixel is created by the image-producer in a sequence and rendered on the end user’s client device in a sequence, too.

Introduction—Challenges in Load Balancing

One consideration in the design of a load balancing system is the tradeoff between the accuracy and overhead. At one extreme, a highly sophisticated mechanism can be designed to report server load using every possible metric, at every single moment. At the opposite end of spectrum, a simple monitoring mechanism could be used to report server load with coarse granularity.

Comprehensive load balancing typically comes with high overhead. In some cases such overhead cannot justify the benefit of having accurate load balancing. Simple load balancing in turn can cause low effectiveness due to the mismatch to the real system load. Preferably, a load balancing system is an optimal combination of low overhead and high accuracy of system load, given the engineering application and parameters for which the system is designed.

Generic load balancing algorithms are generally low performers. Generic load balancing algorithms use generic metrics that are independent of applications. Microprocessor (CPU) time, bandwidth usage, memory usage are all good examples of system-oriented, generic metrics for generic load balancing implementation. For the application of web image processing and serving, such generic metrics can be non-representative of the application-specific nature of load, which as will be described below, typically will be approximately linear related to the number of pixels to process for image processing.

Protocol-based load balancing methods also exist, but are also inadequate. For example, a load balancer can utilize simple counts of transport control protocol (TCP) connection and release requests, and/or HTTP ‘Get’ or ‘Post’ requests/responses, as an indicator of load. While all these generic metrics are important and have uses, once again a drawback is a likely loss of application-specific nature imposed to the system load. For example, the number of HTTP requests to a server is not necessarily indicative of the system load on the machine simply because different requests cause different amounts of load. A single HTTP request could cause a huge load while many requests could cause negligible load.

Load Balancing Principles

Preferably, a load balancing method and system in accordance with the teachings hereof leverages the characteristics of web image processing services, while providing a desirable ratio of low overhead and effective load balancing, at least in one embodiment.

In one embodiment, the load on a given image server can be modeled as proportional to the number of pixels it must process.

In one case, in which an image server is assigned to handle a request to process an image, the image server load represented by the request is given by the form below (Eq. 1), where Lp is the image server load added by an image request with a number of pixels 'p'. The variable 'a' represents the load ratio for the type of request—in other words, the particular service that is being requested to be performed on the image, which results in certain processing of the image (e.g., crop, resizing, recompression, reformat, etc.). The variable β is a constant, which represents the image server load incurred regardless of the size 'p'. Hence, β may be thought of as a baseline load incurred by an image server to receive an image, process it, and transmit the result.

$$L_p=\alpha\times N_p+\beta \quad \text{(Eq. 1)}$$

Figure 3:
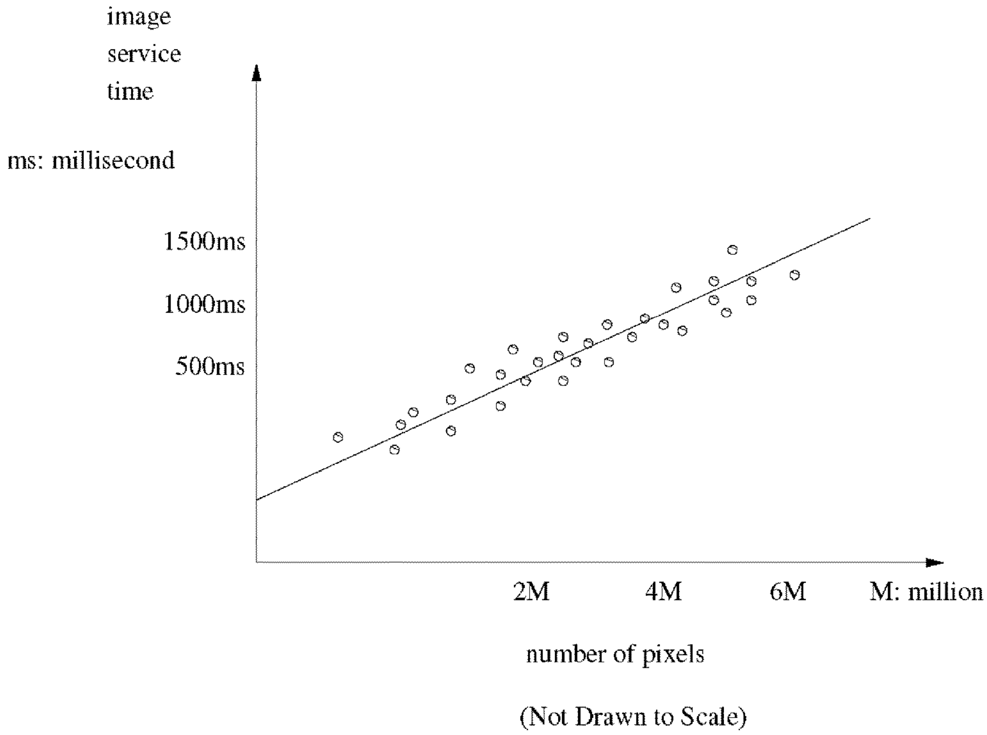
FIG. 3 is a graph showing the rough linearity of image service time vs. the number of pixels in an image.

The linearity of the image server load model comes directly from the way the web image file is constructed and displayed, where each pixel is processed in sequence independently of others, as mentioned above. The linearity is also experimentally shown in a lab environment. FIG. 3 plots image service time in milliseconds against number of pixels in an image as observed in an experiment on a lab computer machine. A variety of different types of image processing services are reflected. It is noted that the plot is general in nature and not to scale; it is merely meant to show the rough linear relationship between service time and number of pixels. In FIG. 3, the image service time is generally linear versus the number of pixels, with a negligible error margin for practical purposes. The values of α and β can be determined by running experiments to obtain the data/graph like FIG. 3 and then analyzing the data and/or the graph. For example, the value β represents the y-intercept, and the value α is the slope of the best fit line.

Of course, the image service time vs. pixel number relationship may not be perfectly linear. While FIG. 3 indicates that the web image conversion processing time is generally linear with some negligible error margin for practical load balancing purposes, it is not perfectly mathematically linear. As the measurement shows, the actual processing times are found around a perfectly linear best-fit line. Because programs often have loops and conditional branches, finding the maximum possible execution time of a given program has proved a difficult question to answer in the field. In the research community, this challenge is often called worst execution time (WET) in the context of real-time computing. Largely, there are two classes of approaches, static code analysis and measurement-based. With the merely generalized accuracy needed for pixel-based cluster load balancing, a very high precision of execution time prediction in sub-milliseconds may not be required. For such a high precision, readers are referred to a survey of such methods found in R. Wilhelm and Others, "The Worst-Case Execution-Time Problem-Overview of Methods and Survey of Tools," ACM Transaction on Embedded Computing Systems TECS), vol. 7, no. 36, April 2008. Existing methods can be used in context with the teachings hereof.

Pixel-Based Load Balancing Embodiment—Single Service Type

In one embodiment, an image server handles only one service type. For example, an image server might provide only a "reformatting" function to change a JPEG format file to WebP format. Each image server therefore has only one queue, in terms of service types. In this case, the load balancing can be done by balancing the number of pixels in queue across the image servers in the cluster.

Preferably upon each arriving request from a client, the load balancer counts or otherwise determines the number of pixels in the image that is the subject of the request. The load balancer then finds the image server with the lowest number of pixels in queue, and assigns the request to that image server. The load balancer then updates the image server status with the newly assigned request (addition of the number of pixels to the load score). The status of image servers can be tracked in a data structure, such as a table or array, maintained and stored by the load balancer. The number of pixels is the load score for the image servers, in this embodiment.

Upon receiving a response message from an image server indicating that the image server is done processing the request, the load balancer can update the image server status, e.g., via subtraction of the number of pixels associated with that request from that image server's load score. The load balancer can then forward the response (with the resultant image) to the network outside toward the client device. However, in some embodiments, the system may be set up such that an image server might send the response directly back to the requesting client, which is referred to in the field as direct server return.

By balancing the number of pixels processed by the image servers, the task of request assignment becomes a lookup in an image server load table, or image server pixel table, to find the image server with the lowest number of pixels at the time of the given client request.

This pixel-based load balancing can incur a very low overhead, as it utilizes only two existing types of messages, request and response. The new metadata introduced by this scheme, the number of pixels, can be easily added to the header portion of HTTP request and response messages. No new protocol design is necessary. It should be noted that a variety of options are possible. A client can insert the number of pixels in the HTTP request, e.g., in a X-header or the like; the load balancer can determine the number of pixels simply be reading in the value. Alternatively, the load balancer could examine the image data and determine the number of pixels, and add the header. The image server can pass along this information to the image server and then in the response with the processed image, the image server sends back the pixel number to the load balancer in a header (or in a separate message) so that the load balancer knows how many pixels to subtract from that given image server's load.

Despite the design with very low overhead, pixel-based load balancing can be highly effective regardless of the machine capacity. In further embodiments, capacity differences among the image servers can be abstracted in the pixel drain rate of each server similar to the way the TCP send/receive buffer is managed by the TCP flow control. This abstraction and its incorporation into the algorithm will be explained further in a following section. However, in the current embodiment, pixel-based load balancing does not require discovering or tracking generic machine capabilities, such as CPU, available memory, disk size, etc. The load balancer just tries to balance the number of pixels across the image servers, regardless of these and/or pixel drain rates. Assume for illustrative purposes that some number 'S' image servers are each assigned with approximately the same number of pixels 'P'. Assume further that some image servers process the same workload faster than others due to the differences in hardware, operating systems, and other overall configuration parameters. In this model, image servers with higher capacity drain the pixels faster. Conversely, image servers of low overall capacity process the pixels at a lower rate. Balancing the number of pixels dynamically across the image servers will automatically balance the load because the overall machine capacity is inherently accounted for in monitoring the pixel queues.

Note that establishing specific values of α and β from Eq. (1) are not required to use the above-described pixel-based load balancing approach. By balancing the number of pixels, the effect of α and β are automatically balanced, too.

Figure 4:
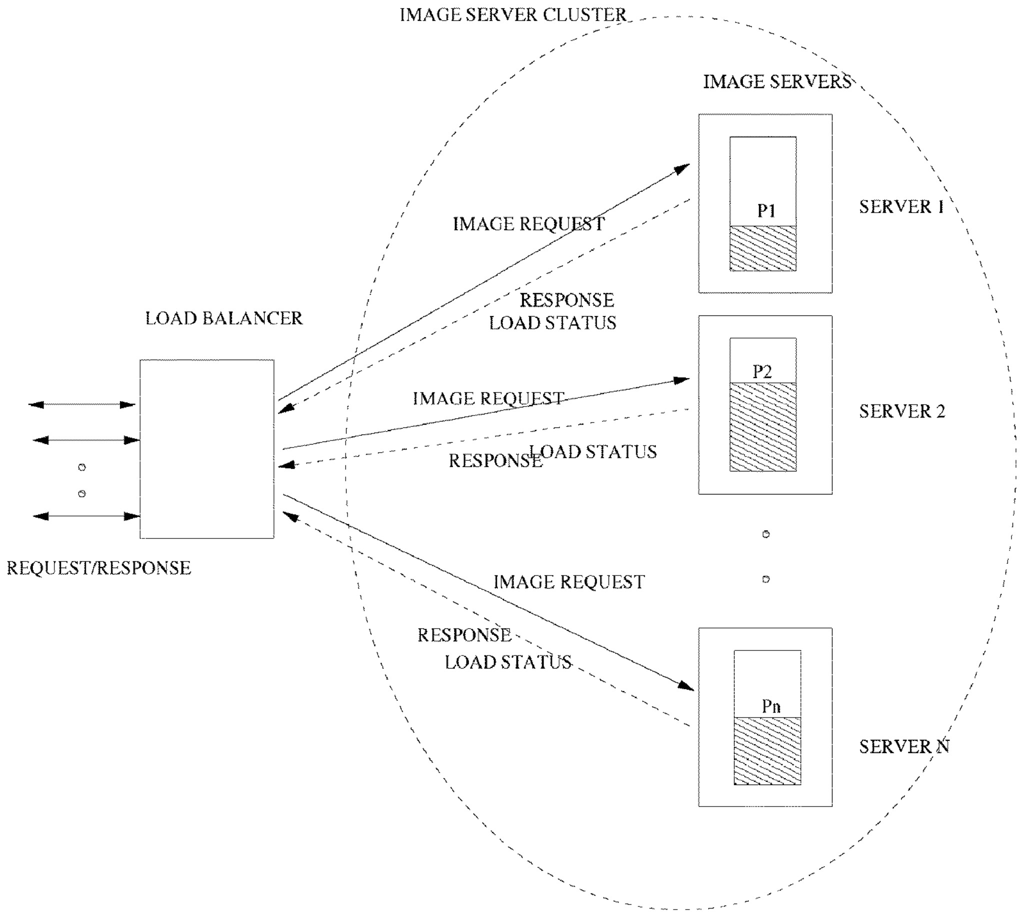
FIG. 4 is a schematic diagram showing one embodiment of a server cluster with multiple image servers and a load balancing node, and an illustration of the pixel load on each image server at a given moment.

FIG. 4 shows an exemplary snapshot of the pixel queue at each image server 1-N in the single service type embodiment. In this snapshot, image server 1 has P1 pixels, image server 2 has P2 pixels and image server N has Pn pixels. The level of pixels is illustrated graphically by the level of the shaded areas within the respective boxes in the image servers. Because the load balancer assigns each image request to a single image server, and, because each request comes with different number of pixels to process, the pixel queues at different image servers show different sizes. It would be rare to have them exactly equal. However, preferably the gap between the largest and smallest queues is always maintained to the minimum by the load balancing algorithm, for example by adding a new image processing request to the image server with the lowest pixel number at the time.

TCP Flow Control Model

The technical strength of the pixel-based load balancing approach described above can be illustrated with reference to the well-known TCP flow control model.

A large amount of Internet traffic is carried by transmission control protocol (TCP). Some important aspects of TCP is said to be its fairness to other TCP traffic and the way that it imposes fairness on both the sender and receiver in a connection. In both cases, fairness is meant to refer to rate control in data transmission.

The principle of fairness is technically implemented in the flow control between a pair of TCP sender and receiver as follows. The sender, in TCP, generally does not send the data at an arbitrary rate. Instead, it actively controls the sending rate such that the receiver's buffer is not overflowing. This is achieved by a design in which the receiver of a TCP message sends current available buffer space to the sender when acknowledging receipt of the TCP message. As long as the sender respects the available buffer size at the receiver (commonly referred to as the "receive window"), the TCP pair is not likely to overrun each other's data handling capacity.

A technical strength of this design is that the TCP pair is not required to track each other's system load in terms of metrics such as available network bandwidth, CPU utilization, disk space, and the like. In effect, though, the load of the receiver and sender is abstracted in the available buffer size in the context of TCP data transport.

Figure 5:
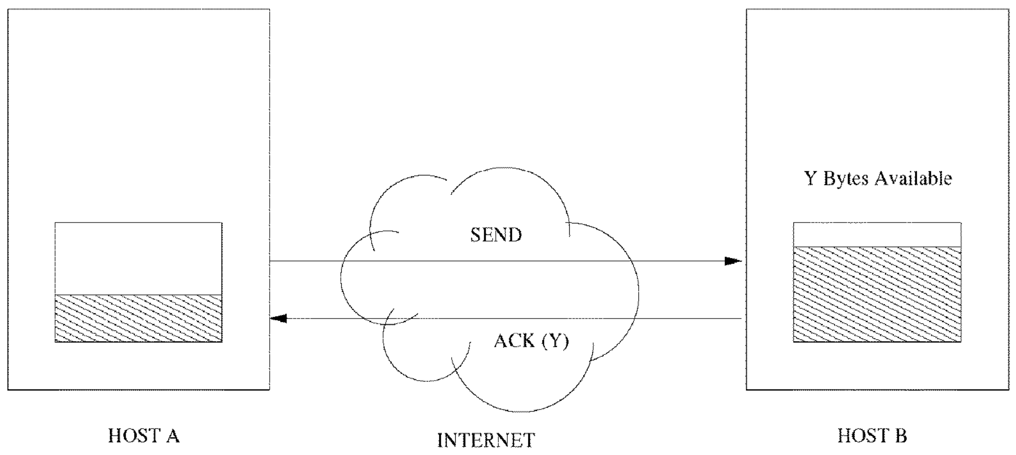
FIG. 5 is a schematic diagram illustrating an aspect of TCP flow control, as known in the art.

A simplified example of TCP flow control is provided in FIG. 5. The shaded area represents the buffer space occupied by some data to be processed at Host A and/or Host B. The white area represents the space available.

In FIG. 5, assume Host A sends some data to Host B over the network, as indicated by the Send arrow. In response, Host B sends an acknowledgement message Ack(Y) back to Host A. One parameter of the acknowledgement message is the number of bytes in the receive buffer available at Host B, which will be used for next reception of data from Host A. Knowing the value Y bytes at Host B, Host A should not send more than Y bytes to Host B. So Host A should not overrun Host B's buffer.

More details about the TCP protocol can be found, for example, in RFCs 793 and 1122 published by the IETF.

Pixel-Based Load Balancing Embodiment—Multiple Service Types

Equation (1) can be generalized to the case where the image server provides a set of multiple services. For example, different services can include changing the compression ratio of the input image in the same file format (e.g., JPEG to JPEG with higher compression), resizing in the same format, reformatting to a different format (e.g., JPEG to WebP, JPEG to PNG, etc.), and the like. Note that the multiple services could be provided by one program or multiple programs on the image server.

Format conversions may create more workload than other service types because at a technical level, they require re-encoding to the target format. In terms of workload, it typically incurs a new encoding time for each pixel of input image in addition to the work of visiting and interpreting each pixel of input image. However, the workload created by this type of re-encoding service also can be well modeled by the linearity in Eq. (1) and FIG. 3.

Therefore, for a set of multiple services, Equation (1) changes to:

$$L_p^i=\alpha^i \times N_p+\beta^i \quad \text{(Eq. 2)}$$

In Eq. 2, 'i' represents the service type that the client device requested to be performed or that must be performed for the input image. The size of the input image is represented in pixels by 'p'. Note that the principle of linearity still applies even though the ratio (a) and constant overhead (β) may change from one service to another. This is because of the nature of web image processing, which is fundamentally a processing of an array or a grid of pixels.

A new challenge in this general case is how to represent the image server load status with a range of service types. To address the challenge, this embodiment introduces the notion of a pixel load factor for load balancing.

Assume that a load balancer maintains the information in Table I, below, for a given image server in a cluster of multiple image servers.

TABLE I

| PIXEL LOAD FACTOR | | | |
|---|---|---|---|
| Service type | Pixel load | Actual pixels | Effective pixels |
| 1 | 1.0 | 20,000 | 20,000 |
| 2 | 1.5 | 10,000 | 15,000 |
| . . . | . . . | . . . | . . . |
| N | 0.7 | 30,000 | 21,000 |

The first column of Table I shows service types. For example, service type 1 might be a service that reformats an image; service type 2 might be a service that resizes an image, and so on. The second column shows the pixel load factor for each service type. The pixel load factor is a per-pixel load ratio between a reference and other service types. In this example, the service type 1 is the reference. The pixel load factor of the service types 1 and N are 1.5 and 0.7 respectively. The third and fourth columns (Actual pixels and Effective pixels) provide examples of the effect of the pixel load factor on an image with a given number of pixels. For example, for service type 2, given an image with 10,000 actual pixels, the effective pixel load is calculated as 15,000 pixels due to a pixel load factor of 1.5. Note that the values shown in Table I are merely arbitrary values created for explanatory purposes, and are not from any actual observed image servers or service types.

Preferably, an image server provides more than one service type. At a given moment, it may have queued images (and thus pixels) that are to be processed with different service types. Assume that, at a particular moment, an image server has three service types (1, 2 and N) with queued pixels, as shown in Table I. In this condition, the load score of the image server is the sum of effective pixels in the last column (56,000=20,000+15,000+21,000). The sum of effective pixels now becomes the load score of an image server providing a range of service types. By unifying different types of services into one load score, the single-service case of load balancing becomes algorithmically the same as the multi-service case.

Figure 6:
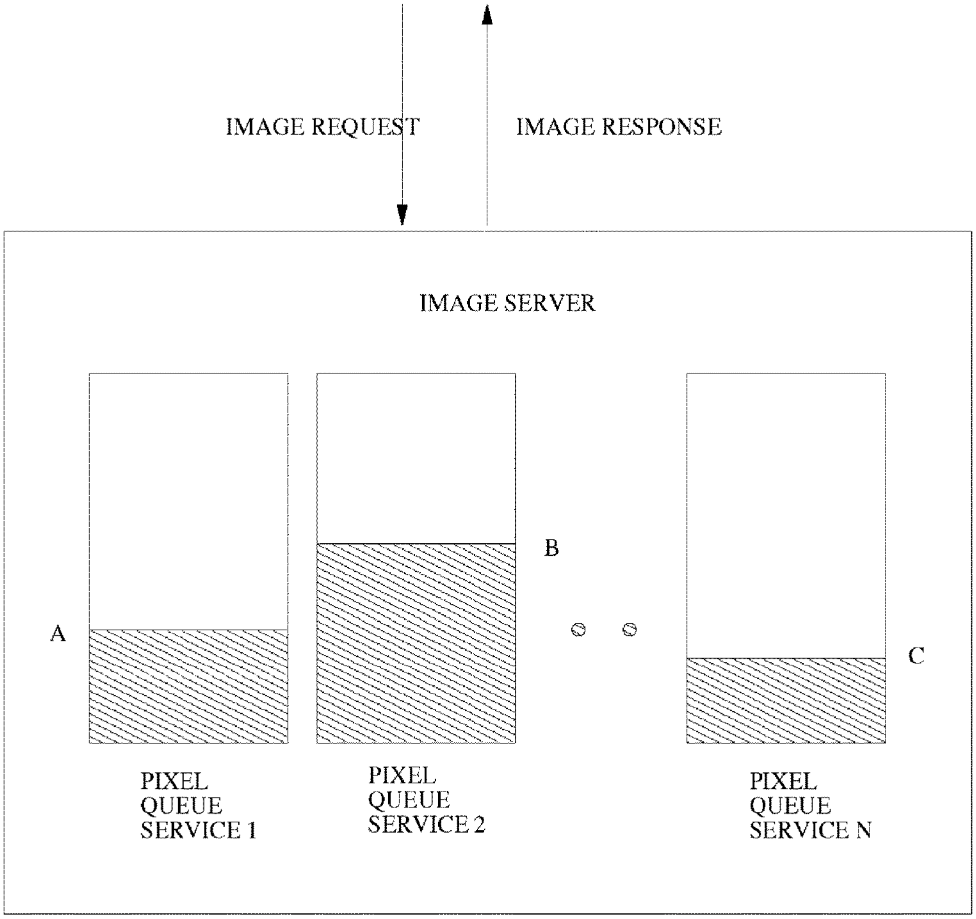
FIG. 6 is a schematic diagram illustrating one embodiment of an image server with a pixel queue for each of multiple image processing services.

FIG. 6 is a schematic diagram showing, in one embodiment, the queues for a given image server at a given point in time. Each of N queues contains some number of pixels. Each queue contains pixels to be processed with a given type of service. FIG. 6 shows N distinct service types. In this example, Service Type 1 has A pixels in queue, Service type 2 has B pixels, and finally Service Type N has C pixels. Any number of services may be tracked this way.

Preferably, if multiple types of requests are served by an image server in a cluster, that image server maintains multiple queues, one for each unique service type. By having the effective pixels in place, however, the pixel load across service types can be combined and converted a single effective pixel load score for that image server, which can be treated as described above in the single-service type case in terms of load balancing logic.

Pixel Load Factor

In one embodiment, a pixel load factor of about 3 might be used in a CPU based environment for converting a JPEG image to a WebP image, where changing a JPEG image to another JPEG image with higher compression is normalized to 1 as the reference service. In other embodiments, a pixel load factor in a range of about 2 to about 4 might be used for the JPEG to WebP conversion. A pixel load factor in a range of about 1 to 2 might be used in a CPU based environment for converting a JPEG image to a PNG image, again where changing a JPEG image to another JPEG image with higher compression is normalized to 1 as the reference service. It should be understood, however, that the pixel load factors will be dependent on the particular hardware/software setup on which the image processing services are intended to be run; establishment of a set of pixel load factors is a straightforward exercise that is driven by the available computing infrastructure to be used and goals of the project.

One way to determine the pixel load factor is to analyze assembly code after the compilation of a high level program of image services for various types. The assembly code shows the CPU cycles required to execute the given instruction. Combining the CPU cycles and the CPU clock, and summing up all the CPU cycles associated with each and every instruction to perform the service, the absolute amount of time for the execution is statically obtained at compile time. By repeating this measurement for a control number of pixels and a range of service types, the pixel load factor can be reliably obtained. More than one test may be run using different control number of pixels. The methods mentioned earlier with regard to FIG. 3 may also be used.

Another way to determine the pixel load factor is to measure the relative workload difference of different service types on common configurations of datacenter server machines in a lab environment. The test machine preferably does not run any application except for the image processing to measure the workload ratio of different service types. This method will include the time incurred by the dynamism of operating systems. Note that this experiment is to determine the relative workload difference between the service types. This is not to measure the machine capacity differences.

Load Balancing—Configured Targets

As mentioned above, in one embodiment, the configured goal of a pixel-based load balancer is to maintain about the same number of effective pixels across the image servers in the cluster, and this can be done by minimizing differences between pixel loads. As one skilled in the art will recognize, in an alternate embodiment, the load balancer could be configured to maintain effective pixel loads with a certain configured allocation of load (e.g., image server 1 to receive 20% of load, image server 2 to receive 50%, image server 3 to receive 30%, and so on). The load balancer could also be configured to maintain effective pixel loads in accord with targets configured for each image server (e.g., image server 1 to have no more than X pixels in queue, image server to have between Y and Z pixels in queue, etc.).

Pixel Based Load Balancing Embodiment—Adjustment Factor for Server Machine Capabilities to Minimize Response Time If the load balancing configuration is to balance evenly the number of effective pixels, then the assigned load to each image server will be approximately equal. If the image servers have similar processing capabilities, the throughput and response time for the image servers will be roughly equal.

But, because of the potential difference of the overall capacity of each image server (e.g., CPU, memory, interface speeds, GPU, connectivity), the throughput for an otherwise equal effective pixel load may not be equal across image servers. In other words, the number of pixels that different image servers can process in a unit time will be different.

This throughput difference in this pixel-based load balancing can result in the response time difference. The response time in this context means the time difference from the time when the image server is assigned a request having some number of pixels until the time the image server is ready to send out the output in a response message, although any reasonable points in time could be used to mark measure and represent response time. Response time affects web page download time. As those skilled in the art will understand, there are many general metrics for web traffic performance from the end user's perspective including connection time, first byte time, single object load time, DOM (document object model) complete time, page download complete time, etc. Due to the importance of the metrics for web traffic delivery optimization, W3C (world wide web consortium) has issued a series of recommendations on the definition of the metrics for objective web traffic performance engineering. Some examples can be found in the W3C documents on navigation timing (NavTiming) and resource timing (ResTiming); see also US Patent Publication No. 20130166634, the contents of which are incorporated by reference for all purposes. The response time of the image server can affect such metrics.

To address this situation, in one embodiment, the load balancer is server-aware and drives towards minimizing response time. Put another way, the load balancer adjusts for variability in image server capability and response time. Web traffic performance optimization is usually measured in time, and it is practical to establish a relationship between the effective number of pixels and expected response time from a particular image server (or, preferably, from a category of image servers with similar throughput). The load balancer can then balance the effective pixel loads such that the response times from the image servers will be about the same, or, the time gap between the lowest and highest response times will be minimized. The aforementioned approaches for pixel-based load balancing can support this kind of performance load balancing when necessary.

With reference to FIG. 5, the load balancer can determine the pixel drain rate of each image server by observing and recording the times when it assigns an image processing request to an image server, and, the time at which it receives a response from the image server that processing is complete (or the actual response with the processed image). The pixel drain rate is the number of pixels an image server processes in a unit time. The pixel drain rate can be calculated as the number of pixels in the request divided by the response time for the image server.

Table II, below, provides an exemplary snapshot of pixel drain rates for server-aware load balancing that can be maintained at the load balancer. The second column shows the current Effective pixels assigned to the image servers. The third column shows the observed Drain rate of each image server. The last column shows the Expected response time in some time unit (in milliseconds or in tens of milliseconds, for example). Note that the values shown in Table II are merely arbitrary values created for explanatory purposes, and are not from any actual observed image servers or response times. In general, expected response times in the range of about 100 ms to 1000 ms are achievable; improved load balancing based on the teachings hereof is preferably designed to minimize and/or improve upon expected response times.

TABLE II

PIXEL DRAIN RATE

| Image server | Effective pixels | Drain rate (pixels/msec) | Expected response time (msec) |
|---|---|---|---|
| 1 | 350.00 | 2,000 | 175 |
| 2 | 320.00 | 1,500 | 213 |
| . . . | . . . | . . . | . . . |
| S | 370.00 | 2,300 | 161 |

Using the multi-server pixel-based load balancing approach described in a prior embodiment, without server-awareness, the next image request will be assigned to Image Server 2. This is because Image Server 2 is the least loaded in terms of effective pixels. In server-aware load balancing for response time minimization, however, the next request will be assigned to the Server S because it has the lowest expected response time.

The approach illustrated by Table II can be generalized by normalizing the pixel drain rate for image servers. Preferably this would be calculated inversely, e.g., if Image Server 1=1.0, then Image Server 2=2k/1.5k=1.33 and Image Server S=2.3k/1.5k=1.53. Then, these server-aware factors can be applied to the effective pixel value. (It should be kept in mind that the effective pixel value is itself preferably the product of the actual number of pixels in an image and a pixel load value based on the particular service being requested.) The final result is a server-aware, effective pixel load. The load balancer can thus track this score for each image server and distribute requests across image servers such that response times are minimized.

Potential Advantages of Pixel-Based Load Balancing Approaches

The following are a number of potential advantages and should not be interpreted to be required characteristics of, or results that will necessarily be achieved by, the teachings hereof. (1) A generic system load metric is unlikely to be as accurate as this application-specific model. Pixel based load balancing has relatively low runtime overhead, because (a) The pixel-based load balancing can be easily implemented by adding the pixel information to a HTTP header or other suitable application protocol header; no new protocol design is necessary; and because (b) Algorithmically, the mathematical computation overhead for load-balancing the number of pixels can be relatively low: one add operation on HTTP request and one subtract operation on HTTP response for example.

It should be appreciated that generic system load metrics are typically representing effects, not causes, of image server load. For example, the number of tasks created by an image server in the course of response is an effect of the request, not the cause. The CPU utilization, as another example is also an effect of accepting requests. The input bandwidth utilization might be thought of as being causal because, assuming a given type of service, the number of bytes may be associated with an expected response time, although likely less accurate than the number of pixels. The output bandwidth utilization is an effect, not a cause.

The number of pixels to process can be thought of as a cause, in fact the root cause, which effects all others that follow. One more disadvantage of generic metrics relative to a pixel-based approach is in the fact that generic metrics may be hard to associate with response time. For example, while a CPU utilization metric for each report period can be important, it is hard to associate with a response time. One hundred percent CPU utilization, taken alone, does not offer insight into an expected response time for next request, because a large number of pixels may keep the CPU utilization at 100% level. The number of active tasks created by an image request(s) are also not necessarily predictive of response time, because each such request likely comes with a different number of pixels.

Use in Content Delivery Networks

In certain embodiments, the teachings hereof can be utilized in the context of a distributed computer system known as a "content delivery network" or "CDN" which may be operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, typically content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent nodes that are located in mobile networks, in or adjacent enterprise-based private networks, or in any combination thereof.

Figure 7:
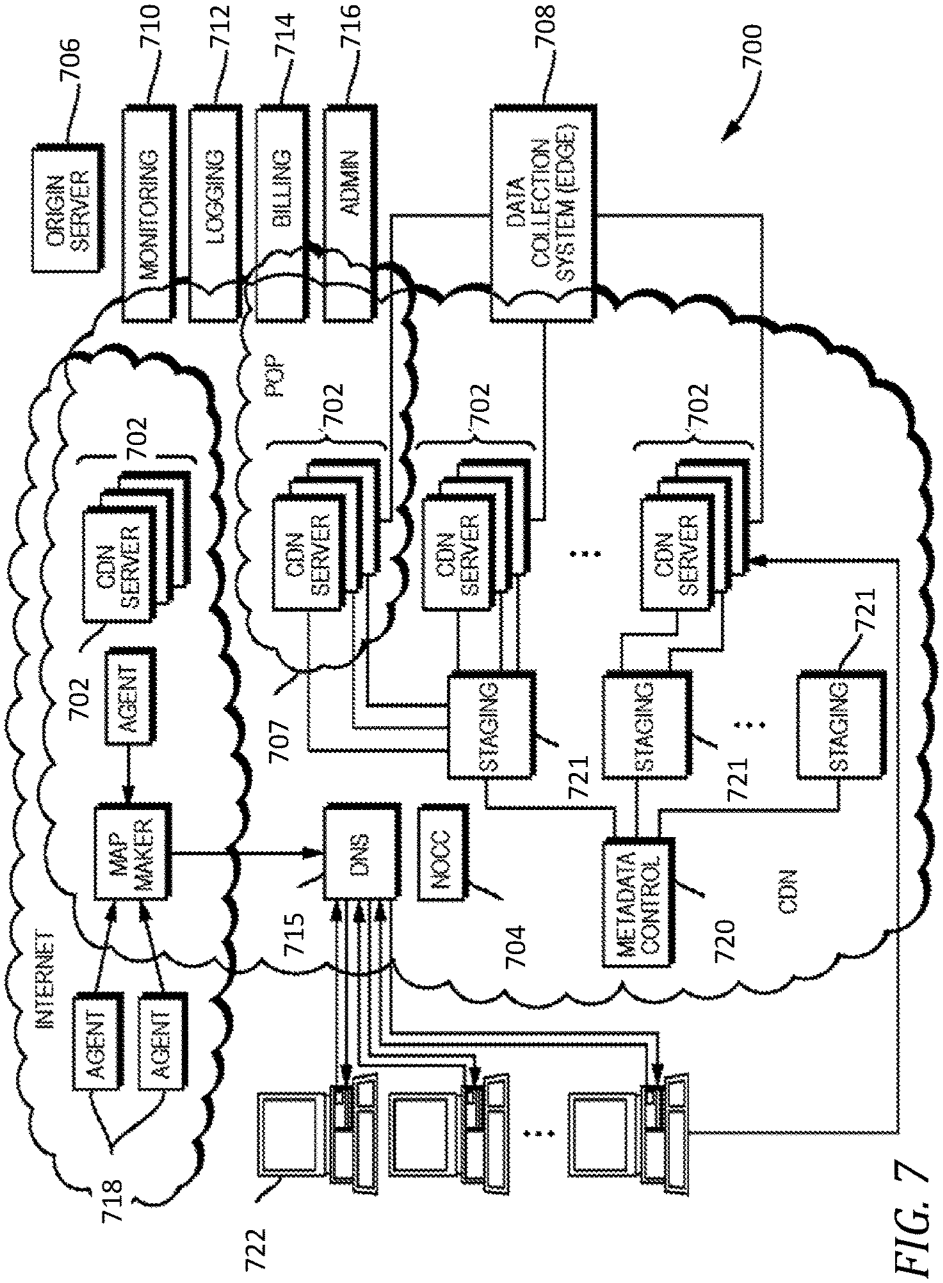
FIG. 7 is a schematic diagram illustrating one embodiment of a known distributed computer system configured as a content delivery network (CDN)

In a known system such as that shown in FIG. 7, a distributed computer system 700 is configured as a content delivery network (CDN) and is assumed to have a set of server machines 702 distributed around the Internet. Typically, most of the machines are located near the edge of the Internet, i.e., at or adjacent end user access networks. A network operations command center (NOCC) 704 may be used to administer and manage operations of the various machines in the system. Third party sites affiliated with content providers, such as web site 706, offload delivery of content (e.g., HTML or other markup language files, embedded page objects, streaming media, software downloads, and the like) to the distributed computer system 700 and, in particular, to the server machines 702 (which are sometimes referred to as content servers, or sometimes as "edge" servers in light of the possibility that they are near an "edge" of the Internet). Such servers may be grouped together into a point of presence (POP) 707.

Typically, content providers offload their content delivery by aliasing (e.g., by a DNS CNAME) given content provider domains or sub-domains to domains that are managed by the service provider's authoritative domain name service. End user client machines 722 that desire such content may be directed to the distributed computer system to obtain that content more reliably and efficiently. The CDN servers 702 respond to the client requests, for example by obtaining requested content from a local cache, from another CDN server, from the origin server 706, or other source.

Although not shown in detail in FIG. 7, the distributed computer system may also include other infrastructure, such as a distributed data collection system 708 that collects usage and other data from the CDN servers 702, aggregates that data across a region or set of regions, and passes that data to other back-end systems 710, 712, 714 and 716 to facilitate monitoring, logging, alerts, billing, management and other operational and administrative functions. Distributed network agents 718 monitor the network as well as the server loads and provide network, traffic and load data to a DNS query handling mechanism 715, which is authoritative for content domains being managed by the CDN. A distributed data transport mechanism 720 may be used to distribute control information (e.g., metadata to manage content, to facilitate load balancing, and the like) to the CDN servers 702.

Figure 8:
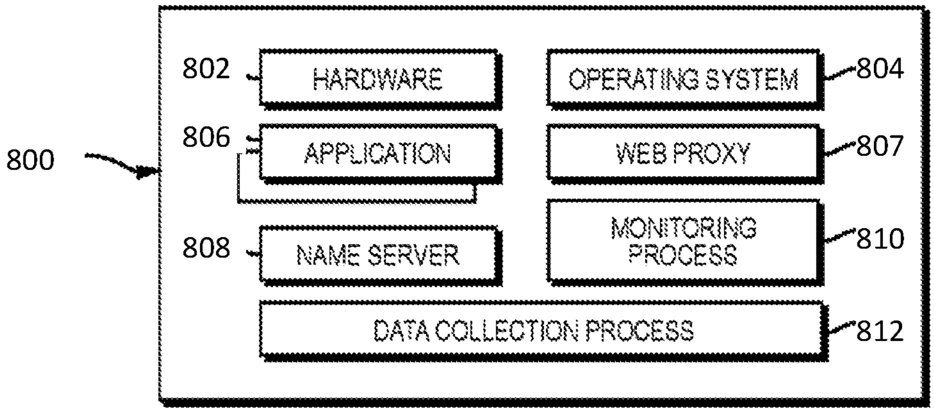
FIG. 8 is a schematic diagram illustrating one embodiment of a machine with which a CDN server in the system of FIG. 7 can be implemented.

As illustrated in FIG. 8, a given server machine 800 (corresponding to CDN server 702) comprises commodity hardware (e.g., a microprocessor) 802 running an operating system kernel (such as Linux® or variant) 804 that supports one or more applications 806*a-n*. To facilitate content delivery services, for example, given machines typically run a set of applications, such as an HTTP proxy 807, a name server 808, a local monitoring process 810, a distributed data collection process 812, and the like. The HTTP proxy 807 (sometimes referred to herein as a global host or "ghost") typically includes a manager process for managing a cache and delivery of content from the machine. For streaming media, the machine may include one or more media servers, such as a Windows® Media Server (WMS) or Flash server, as required by the supported media formats.

A given CDN server 702 shown in FIGS. 7 and 8 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server 702 via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server 702 associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

Incorporating the teachings hereof for pixel-based load balancing, at least some of the CDN servers 702 can be configured as image servers. For example, at a given PoP 707, a set of one or more image servers can be deployed, hereinafter referred to as CDN image servers 702. These image servers can function to perform image processing services either directly for end user clients, or, in a preferred embodiment, for other CDN servers 702 that are receiving requests from end-user client devices 722. More specifically, when a given CDN server 702 is responding to a client request, it may find that it needs a processed version of a given web image to serve to the client device. This may be based, for example, on knowledge of the requesting client device characteristics as obtained by the CDN server through examination the User-Agent header in the client device's request for the image, or otherwise. The given CDN server 702 can obtain and send the original version of the image (or a URL therefor) to the cluster of CDN image servers 702. A CDN image server 702 is selected by the load balancer using the teachings hereof, and that selected CDN image server 702 will process the image as requested and provide a processed version (e.g., recompressed, reformatted, cropped, etc., according to requested service) back to the given CDN server 702 for delivery to the client device 722. Alternatively, the given CDN server 702 can rewrite a URL in an HTML page that pointed to an original version of the image, such that it points to the CDN's image server 702. Upon receipt of this rewritten URL, the client device 722 will request the image from the cluster of CDN image servers 702, and a CDN image server 702, again selected by the load balancer using the teachings hereof, will respond by obtaining the original version of the requested image (e.g., from cache or from origin), and processing it in accord with knowledge of the client device characteristics and/or based on embedded URL parameters (e.g., as inserted as part of the URL rewrite) or based on other directive in a separate message or otherwise. The parameters and/or directive dictate the service and desired parameters of the service (such as a reduce by 50%, reformat to WebP, resize to X by Y pixels, and the like).

In all cases in the preceding paragraph, the CDN image servers 702 can be deployed in clusters of multiple image servers 702 and the requests can be load-balanced amongst them as described by the teachings hereof for pixel based load balancing, to select a given CDN image server 702 to handle a request and respond with a processed image.

More Information about CDNs which May be Combined with Teachings Hereof

As an overlay, the CDN resources may be used to facilitate wide area network (WAN) acceleration services between enterprise data centers (which may be privately managed) and to/from third party software-as-a-service (SaaS) providers.

Figure 9:
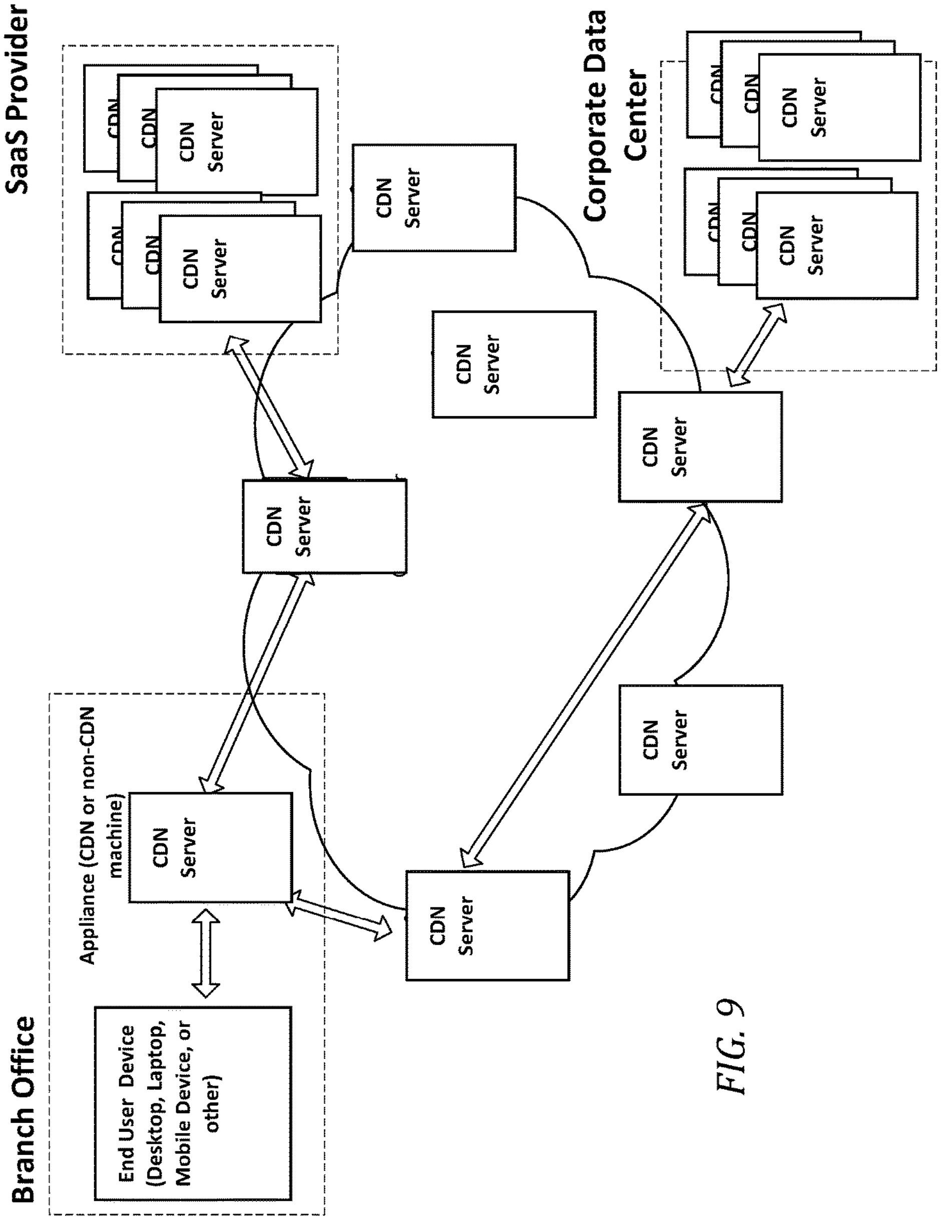
FIG. 9 is a schematic diagram illustrating one embodiment of an overlay network.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end. FIG. 9 illustrates a general architecture for a WAN, optimized, "behind-the-firewall" service offerings described above.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The client devices, image servers, load balancers, and other components described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 10:
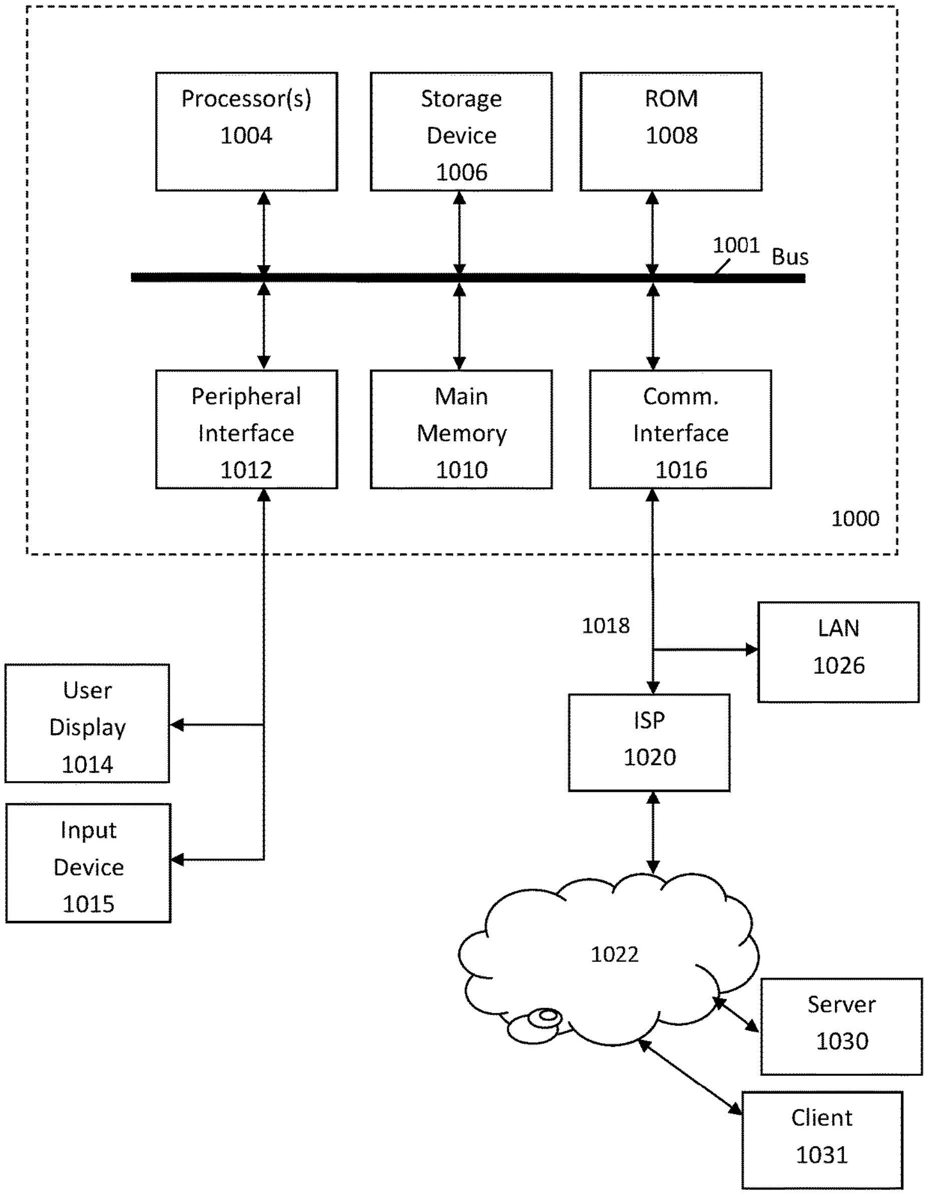
FIG. 10 is a block diagram illustrating hardware in a computer that may be used to implement the teachings hereof.

FIG. 10 is a block diagram that illustrates hardware in a computer system 1000 upon which such software may run in order to implement embodiments of the invention. The computer system 1000 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 1000 includes a microprocessor 1004 coupled to bus 1001. In some systems, multiple processor and/or processor cores may be employed. Computer system 1000 further includes a main memory 1010, such as a random access memory (RAM) or other storage device, coupled to the bus 1001 for storing information and instructions to be executed by processor 1004. A read only memory (ROM) 1008 is coupled to the bus 1001 for storing information and instructions for processor 1004. A non-volatile storage device 1006, such as a magnetic disk, solid state memory (e.g., flash memory), or optical disk, is provided and coupled to bus 1001 for storing information and instructions. Other application-specific integrated circuits (ASICs), field programmable gate arrays (FPGAs) or circuitry may be included in the computer system 1000 to perform functions described herein.

A peripheral interface 1012 communicatively couples computer system 1000 to a user display 1014 that displays the output of software executing on the computer system, and an input device 1015 (e.g., a keyboard, mouse, trackpad, touchscreen) that communicates user input and instructions to the computer system 1000. The peripheral interface 1012 may include interface circuitry, control and/or level-shifting logic for local buses such as RS-485, Universal Serial Bus (USB), IEEE 1394, or other communication links.

Computer system 1000 is coupled to a communication interface 1017 that provides a link (e.g., at a physical layer, data link layer, or otherwise) between the system bus 1001 and an external communication link. The communication interface 1016 provides a network link 1018. The communication interface 1016 may represent a Ethernet or other network interface card (NIC), a wireless interface, modem, an optical interface, or other kind of input/output interface.

Network link 1018 provides data communication through one or more networks to other devices. Such devices include other computer systems that are part of a local area network (LAN) 1026. Furthermore, the network link 1018 provides a link, via an internet service provider (ISP) 1020, to the Internet 1022. In turn, the Internet 1022 may provide a link to other computing systems such as a remote server 1030 and/or a remote client 1031. Network link 1018 and such networks may transmit data using packet-switched, circuit-switched, or other data-transmission approaches.

In operation, the computer system 1000 may implement the functionality described herein as a result of the processor executing code. Such code may be read from or stored on a non-transitory computer-readable medium, such as memory 1010, ROM 1008, or storage device 1006. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 1018 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method of load-balancing image processing requests across a plurality of image servers in a content delivery network (CDN), the method comprising:

receiving a first HTTP request to process a first image, the first HTTP request comprising an identification of the first image and a directive to process the first image in accordance with a first image processing service;

determining a number of pixels in the first image, wherein said determination comprises at least one of: (a) counting the number of pixels in the first image and (b) reading pixel information from an HTTP header of the first HTTP request;

determining a load score for the first request, the load score based at least in part on the product of multiplying (i) the number of pixels in the first image, and (ii) a first factor associated with the first image processing service, wherein the first factor reflects processing time necessary to provide the first image processing service for a given image relative to the processing time necessary to provide a reference image processing service for the given image;

assigning the first HTTP request to a first image server of the plurality of image servers, the plurality of image servers being in a content delivery network (CDN);

because of said assignment, updating a load score for the first image server by adding the load score for the first HTTP request to the load score for the first image server;

receiving a second HTTP request to process a second image, the second HTTP request comprising an identification of the second image and a directive to process the second image in accordance with a second image processing service;

determining a number of pixels in the second image, wherein said determination comprises at least one of: (a) counting the number of pixels in the second image and (b) reading pixel information from an HTTP header of the second HTTP request;

determining a load score for the second request, the load score based at least in part on the product of multiplying (i) the number of pixels in the second image, and (ii) a second factor associated with the second image processing service;

assigning the second request to a second image server of the plurality of image servers;

because of said assignment, updating a load score for the second image server by adding the load score for the second request to the load score for the second image server; and, load-balancing at least a third image processing request amongst the plurality of image servers, based at least in part on the updated load scores for the first and second image servers.

2. The method of claim 1, further comprising:

receiving a message from the first image server that the first HTTP request is complete;

in response to the message, updating the load score for the first image server by subtracting the load score for the first HTTP request from the load score for the first image server.

3. The method of claim 1, further comprising, wherein at least one of the first and the second image processing services comprises:

a service that converts an image from a first format to a second format;

a service that changes a resolution of an image;

a service that resizes an image;

a service that crops an image;

a service that changes a compression level applied to an image.

4. The method of claim 1, wherein the first HTTP request further includes a count of the number of pixels in the first image as pixel information, and determining the number of pixels in the first image comprises reading the count.

5. The method of claim 1, further comprising determining the load score for the first image server based at least in part on the product of multiplying (i) the number of pixels in the first image, and (ii) the first factor associated with the first image processing service and (iii) a third factor associated with processing capabilities of the first image server.

6. The method of claim 1, further comprising calculating a first expected response time for the first image server based on the load score for the first image server.

7. A distributed computing system for processing images, comprising:

a plurality of image servers, each comprising a computer having one or more microprocessors and memory storing program code executable on the one or more microprocessors to provide one or more image processing services, the plurality of image servers being deployed in a content delivery network (CDN);

a load-balancing node for distributing image processing requests amongst the plurality of image servers, the load balancing node comprising a computer having one or more microprocessors and memory storing program code executable on the one or more microprocessors;

the load balancing node storing program code for receiving a first HTTP request to process a first image, the first HTTP request comprising an identification of the first image and a directive to process the first image in accordance with a first image processing service;

the load balancing node storing program code for determining a number of pixels in the first image, wherein said determination comprises at least one of: (a) counting the number of pixels in the first image and (b) reading pixel information from an HTTP header of the first HTTP request;

the load balancing node storing program code for determining a load score for the first HTTP request, the load score based at least in part on the product of multiplying (i) the number of pixels in the first image, and (ii) a first factor associated with the first image processing service, wherein the first factor reflects processing time necessary to provide the first image processing service for a given image relative to the processing time necessary to provide a reference image processing service for the given image;

the load balancing node storing program code for assigning the first HTTP request to a first image server of the plurality of image servers;

the load balancing node storing program code for, in response to said assignment, updating a load score for the first image server by adding the load score for the first HTTP request to the load score for the first image server;

the load balancing node storing program code for receiving a second HTTP request to process a second image, the second HTTP request comprising an identification of the second image and a directive to process the second image in accordance with a second image processing service;

the load balancing node storing program code for determining a number of pixels in the second image wherein said determination comprises at least one of: (a) counting the number of pixels in the second image and (b) reading pixel information from an HTTP header of the second HTTP request;

the load balancing node storing program code for determining a load score for the second HTTP request, the load score based at least in part on the product of multiplying (i) the number of pixels in the second image, and (ii) a second factor associated with the second image processing service;

the load balancing node storing program code for assigning the second HTTP request to a second image server of the plurality of image servers;

the load balancing node storing program code for, in response to said assignment, updating a load score for the second image server by adding the load score for the second HTTP request to the load score for the second image server;

the load balancing node performing load-balancing for at least a third image processing request amongst the plurality of image servers, based at least in part on the updated load scores for the first and second image servers.

8. A method of load-balancing image processing requests across a plurality of image servers in a content delivery network (CDN), the method operable at a load balancing node, the method comprising:

updating a load score for each of the plurality of image servers, wherein the load balancing node determines the load score for a given image server at least in part by summing image processing request scores for image processing requests that are in queue for the given image server, wherein each image processing request comprises an HTTP request;

the load balancing node determining each respective image processing request score at least in part by multiplying (i) the number of pixels in an image identified in the respective image processing request and (ii) a factor associated with the image processing service specified in a directive in the respective image processing request, wherein the factor reflects processing time necessary to provide the first image processing service for a given image relative to the processing time necessary to provide a reference image processing service for the given image;

wherein the load balancing node determines the number of pixels in images identified in the respective image processing requests by performing at least one of: (a) counting the number of pixels in a given image and (b) reading pixel information from an HTTP header of the respective image processing request;

load-balancing traffic amongst the plurality of image servers based on the updated load scores for each of the plurality of image servers;

wherein the plurality of images servers are deployed in a content delivery network (CDN).

9. The method of claim 8, wherein the load-balancing comprises allocating traffic amongst the plurality of image servers according to a configuration stored at the load balancing node.

10. The method of claim 8, wherein the load-balancing comprises assigning a received image processing request to an image server with the lowest load score at the time of the received request.

11. The method of claim 8, wherein the load-balancing comprises allocating traffic amongst the plurality of image servers so as to minimize expected response time for a received image processing request.

12. A method of load-balancing image processing requests across a plurality of image servers in a distributed computing system that provides a content delivery network (CDN), the method comprising:

receiving a first HTTP request to process a first image, the first HTTP request comprising an identification of the first image and a directive to process the first image in accordance with a first image processing service;

determining a value representative of a number of pixels in the first image, wherein said determination comprises at least one of: (a) counting the number of pixels in the first image and (b) reading pixel information from an HTTP header of the first HTTP request;

determining a load score for the first HTTP request, the load score based at least in part on (i) a value representative of a number of pixels in queue for each of the plurality of image servers, and (ii) a pixel drain rate for each of the plurality of image servers, and (iii) a factor associated with the first image processing service, wherein the factor reflects processing time necessary to provide the first image processing service for a given image relative to the processing time necessary to provide a reference image processing service for the given image;

assigning the first HTTP request to a first image server of the plurality of image servers in a content delivery network (CDN);

in response to said assignment, updating the value representative of the number of pixels in queue for the first image server by adding thereto the value representative of the number of pixel in the first image;

load-balancing at least one subsequent image processing request amongst the plurality of image servers, based at least in part on the updated value representative of the number of pixels in queue for the first image server.

13. The method of claim 12, wherein the value representative of the number of pixels in the first image is any of: an actual pixel number and an effective pixel number.

14. The method of claim 12, further comprising: determining to assign the first HTTP request to the first image server at least in part because the first image server has a lowest expected response time amongst the plurality of image servers, at the time of the first HTTP request.

* * * * *